Aug. 31, 1926.  1,598,099
J. A. MURRAY
CONVEYING TABLE
Filed March 26, 1925      3 Sheets-Sheet 1
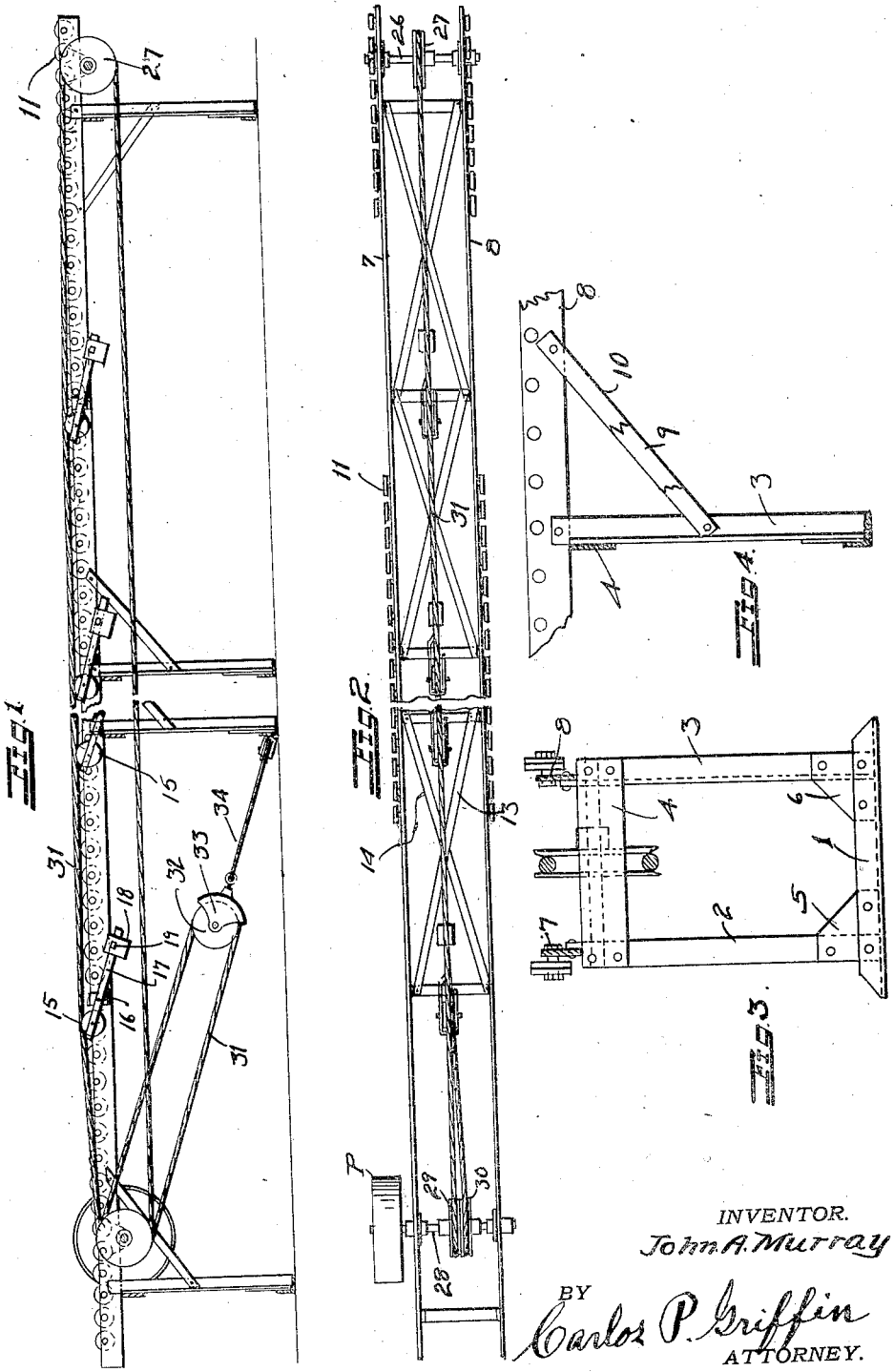
INVENTOR.
John A. Murray.
BY Carlos P. Griffin
ATTORNEY.

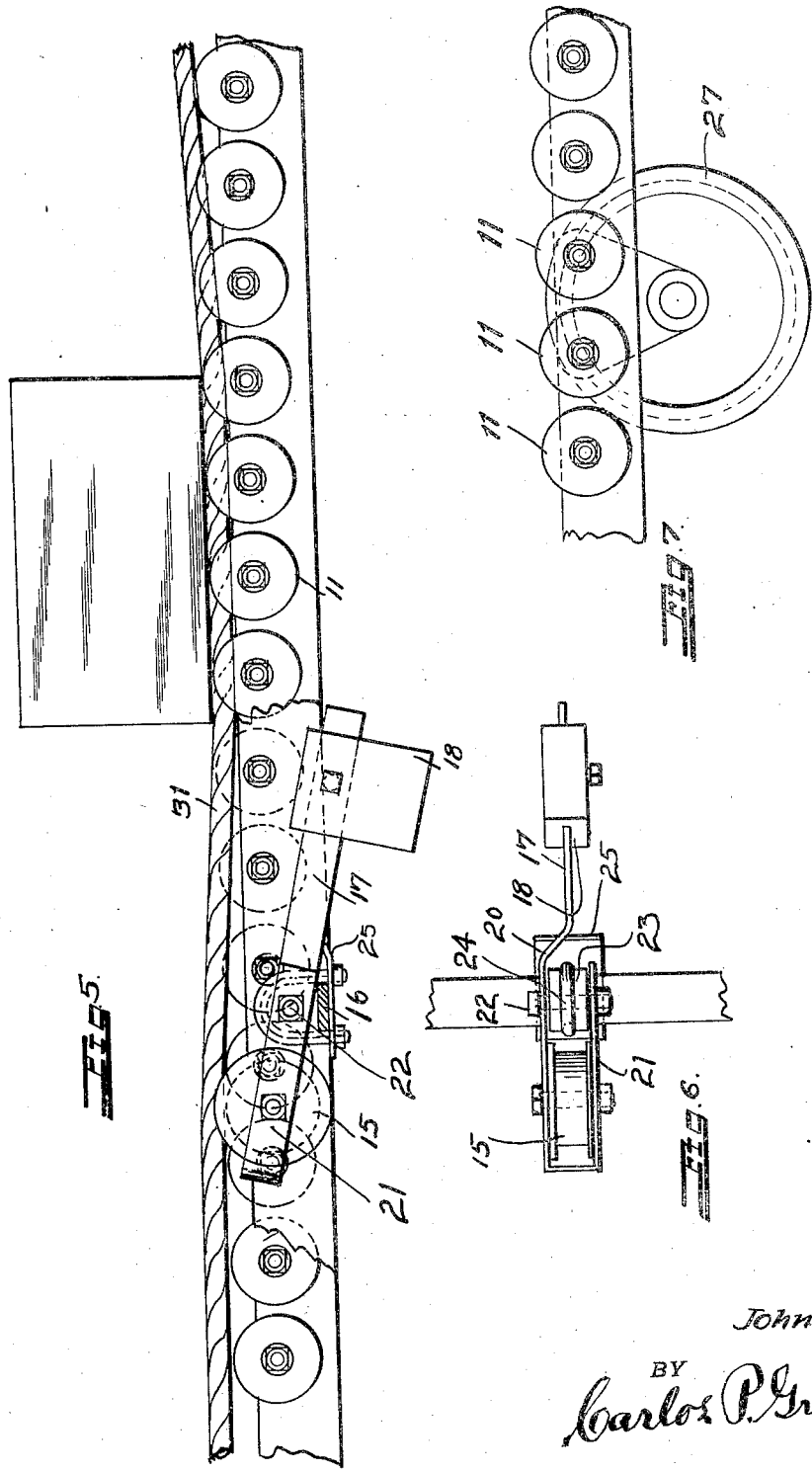

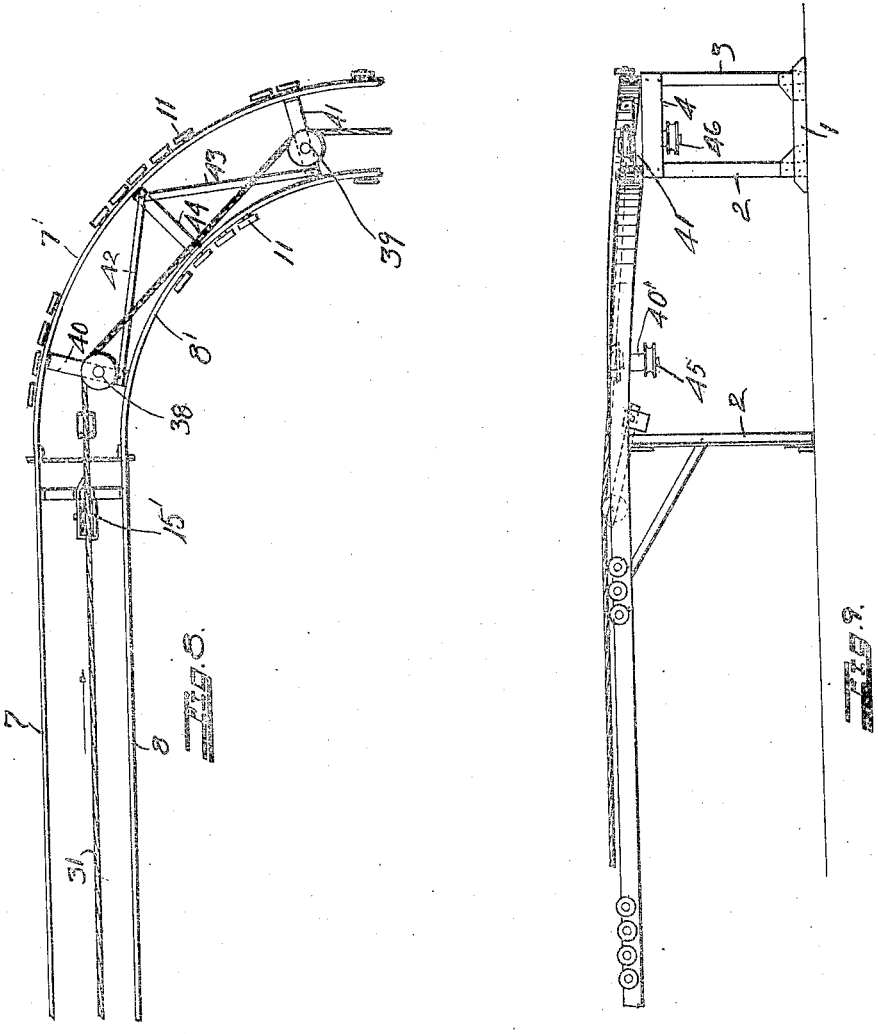

Patented Aug. 31, 1926.

1,598,099

UNITED STATES PATENT OFFICE.

JOHN A. MURRAY, OF SAN FRANCISCO, CALIFORNIA, ASSIGNOR TO MAILLER SEARLES, INC., A CORPORATION OF CALIFORNIA.

CONVEYING TABLE.

Application filed March 26, 1925. Serial No. 18,411.

This invention relates to a conveying table, and its object is to produce a table which is capable of shifting a series of packages from one end to the other thereof at a reasonable rate of speed, and with a comparatively small power plant. The power being only sufficient to shift the packages, and not great enough to support or carry the entire weight of the packages that might accumulate upon the table.

It will be understood by those skilled in the art that where long package carrying tables are used, if an endless belt carrier is used, a tremendous accumulation of weight may be piled upon the belt at times when the load is stopped, the belt sliding under the load, and as this load increases, the power required to operate the belt necessarily increases unduly, and this is necessary because all of the load must be started at one time when one box or package at the discharge end is removed from the line.

With the present invention the load is supported by two lines of rollers and a rope is used to shift the packages from one end of the table to the other. This rope bears upon the underside of the packages with only sufficient force to cause an individual package to move, suitable counter-weights being used to lift the rope high enough to cause it to pull the packages, and if a long line of packages is stopped upon the rope, it will slide under them, but with no more friction upon the line of packages than is caused by the several counter-weights, and when one package is removed from the end of the line, only one package will start, and after it is moved a short distance another package will start, and so on down the entire line of packages resting upon the rope, so that it is possible to use a very small motor in the place of the larger motor to drive the ordinary belt conveyer.

Another advantage of this invention lies in the fact that it attains the necessary results with a very much cheaper construction than is the case with the usual belt conveyer, which must be fully supported throughout, and which must be of a material capable of sustaining the wear of the entire weight of the packages, the rope in the present instance only sustaining the wear due to a force large enough to slide the packages along when supported by the rollers.

Another advantage of this invention lies in the fact that the conveying table can be level or inclined upwardly at a small angle if desired, thereby making it possible to have the conveyer at the same level, if desired, throughout its entire length, a very considerable advantage over the ordinary form of gravity conveyer, in which the supports get higher and higher as the table is extended.

Another advantage of this conveyer lies in the possibility of using the same drive to carry the packages around corners, a gravity turn being used for the packages and idlers for the rope as it passes around the corner.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a side elevation of two sections of a long conveyer.

Fig. 2 is a plan view of the sections shown in Fig. 1.

Fig. 3 is a view of one of the table frames, showing the position of one of the end supporting rollers.

Fig. 4 is a side elevation of one of the table supporting frames, and a portion of one of the side rails.

Fig. 5 is a sectional view showing one of the side rails on a larger scale, and also illustrating one of the pressure rollers.

Fig. 6 is a plan view of one of the pressure rollers.

Fig. 7 is a side elevation of a portion of the rail supporting rollers and rope roller at one end of the table.

Fig. 8 is a plan view of the conveying table at the corner.

Fig. 9 is a side elevation of the same table at the corner.

The table consists of a series of frames for supporting the rails and load, each frame having an angle iron base 1, legs 2 and 3, a cross bar 4, at the top of the legs. The base and the legs are connected by the gasket plates 5 and 6, to give additional stiffness, and each of the legs projects above the top of rail 4 a slight distance to be connected with the side rails 7 and 8. Each side rail is additionally connected to its adjacent leg member by means of the braces 9 and 10, and each rail is provided with a plurality of holes throughout its entire length, as shown in Fig. 4, to support the small rollers 11, said rollers being of any suitable type, and in such number as will completely support the packages throughout the entire length of the table.

At intervals the frames may be connected by means of horizontal braces 13, 14, and wherever it is desired to put one of the balance rollers 15 there may be a cross bar 16, the balance rollers are supported by levers 17, which carry weights 18, attached in any given position on the lever by means of the set screws 19. The levers are bent as shown in 20, in Fig. 6, to bring the weights in alignment with rollers 15, and to balance the roller fairly under the package, one end of the lever is bent around, as shown at 21, and the bolt 22 passes through the lever on each side of the supporting block 23, said block being connected to the cross bar by a U-bolt 24, said U-bolt also supporting the stop plate 25.

At one end of the table there is a shaft 26, carrying the rope pulley 27, while at the other end of the table there is a shaft 28, carrying two of the rope pulleys 29, 30. The rope 31 passes over the top of the pulleys 15, which are raised by the weights high enough to engage the packages, while the take-up loop of the rope passes around a pulley 32, journalled in the hood 33, and kept taut by a rope or cable 34, connected to the foot of one of the table frames.

In operation the boxes or packages are piled upon the table, an effort being made to place them so that they will ride squarely on the rollers, although they will not run off if unevenly placed, whereupon the pressure of the rope will cause them to move to one end of the table or the other, as may be desired, depending upon which way the rope is operated, as the packages pass over the rollers 15, they are depressed and they continue to travel.

If the line of boxes or packages is stopped, the rope continues its travel bearing upon the boxes due to the pressure of the weights 18, but without an undue increase in the load upon the motor driving the rope, and whenever one of the boxes is taken off at the end of the line, the boxes will at once start into motion, one or more at a time, but in any event the motor cannot be overloaded, and only a small motor is required.

In this particular instance power is applied to the apparatus by the drive pulley "P" on the shaft 28.

Where it is desired to extend the operations around a corner, the side rails 7 and 8 are connected to an adjacent table placed at an angle with the first table by means of the curved side rails 7', 8', the curve being of any desired degree. These rails when so extended are provided with the rollers 11, precisely the same as the other parts of the table and the curved section is given a sufficient grade to allow the packages to slide around the same and pass on to the straight section without the aid of the rope. The rope 31 then passes over one of the adjustable pressure rollers 15, which takes the place of the end pressure pulley 27, said pulley being supported in substantially the same way as the other pulleys 15, after passing over the pulley 15', the rope then passes over two pulleys 38, 39, which are supported by cross-bars 40, 41, connected to the curved rails 7', 8', at such a point as to bring the rope in alignment with the pulleys 15, 15'. These side rails 7', 8', are also braced by means of the horizontal members 42, 43, and by means of an additional cross-brace 44, such a number of supporting legs being used as may be desired.

In order to provide for the return of the rope, the plates 40' and 41' are secured under the plates 40, 41, and they carry the grooved pulleys 45, 46, to receive the return run of the rope.

It will be seen that the pulleys 38, 39 are just below the level of the tops of the rollers 11, so that the rope does not touch the packages as they pass around the curve, this is necessary to prevent the packages from being worked to one side or the other by the rope, because it cannot easily be maintained in a central position throughout its entire length as it passes around the curve.

What I claim is as follows, but various modifications may be made in the construction shown in the drawings and above particularly described form, within the purview of my invention.

1. A conveying table comprising supporting frames, pairs of side rails carried thereby, a plurality of rollers carried by said rails, a series of movable pulleys supported at intervals along the rails with their highest portion slightly above the top of the side rails, an endless rope passing over said pulleys, means to regulate the pressure required to depress said pulleys, pulleys at the ends of the side rails, over which the rope passes, a slack take-up for said rope, and means to drive the same.

2. In a conveying table, a pair of side rails having a curved section, a plurality of package supporting rollers carried by each rail, an endless conveyer between the rails, pulleys on substantially vertical axes to cause the conveyer to pass around the curved section, other pulleys on substantially horizontal axes at the ends of the conveying table to support the conveyer, means to hold said conveyer in contact with the packages supported by the rollers in the straight sections of the conveying table, and means to drive said conveyer.

3. A conveying table, a pair of supporting rails, including a curved section having a sufficient grade to cause the packages to travel around the same without assistance, an endless conveyer between the rails, means to hold the conveyer in contact with the underside of the packages in the straight sections of the table, pulleys to hold the conveyer out of contact with the packages in the curved section of the table and means to drive the endless conveyer.

4. A conveying table, comprising a supporting frame, a pair of side rails, spaced rollers mounted on said rails with their top portion projecting above said rails, an endless rope running over pulleys between said rails, said pulleys being mounted on pivoted bars in said frame, an adjustable weight on said bar adapted to raise said pulleys with said rope thereon above the tops of said rollers, and means to drive said endless rope.

5. A conveying table comprising a supporting frame, a pair of side rails, spaced rollers mounted on said rails, and adapted to support and allow boxes to be conveyed thereon with a minimum of friction, a driven endless rope between said rails, said rope being adapted to be pressed up against the bottom portion of said boxes by means of spaced pulleys mounted to exert a resilient pressure thereon, and means to keep said rope taut.

In testimony whereof I have hereunto set my hand March A. D. 1925.

JOHN A. MURRAY.